United States Patent
Larkin et al.

(10) Patent No.: US 10,014,959 B2
(45) Date of Patent: Jul. 3, 2018

(54) STANDING WAVE REDUCTION IN DIRECT FIELD ACOUSTIC TESTING

(71) Applicant: MSI DFAT LLC, Baltimore, MD (US)

(72) Inventors: Paul Larkin, Mt. Airy, MD (US); Matthew Polk, Gibson Island, MD (US); Dann Hayes, Resiterstown, MD (US); Michael Sullivan, Eldersburg, MD (US); Arthur Isaacs, Columbia, MD (US)

(73) Assignee: MSI DFAT LLC, Baltimore, MD (US)

( * ) Notice: Subject to any disclaimer, the term of this patent is extended or adjusted under 35 U.S.C. 154(b) by 797 days.

(21) Appl. No.: 14/543,681

(22) Filed: Nov. 17, 2014

(65) Prior Publication Data

US 2015/0138916 A1 May 21, 2015

Related U.S. Application Data

(60) Provisional application No. 61/904,931, filed on Nov. 15, 2013.

(51) Int. Cl.
| | | |
|---|---|---|
| *H04B 17/00* | (2015.01) | |
| *H04B 11/00* | (2006.01) | |
| *G01M 7/00* | (2006.01) | |

(52) U.S. Cl.
CPC ............. *H04B 11/00* (2013.01); *G01M 7/00* (2013.01); *H04B 17/0082* (2013.01); *H04B 17/0085* (2013.01); *H04B 17/0087* (2013.01)

(58) Field of Classification Search
CPC H04B 11/00; H04B 17/0082; H04B 17/0087; H04B 17/0085

USPC .......................................................... 73/584
See application file for complete search history.

(56) References Cited

U.S. PATENT DOCUMENTS

| | | | |
|---|---|---|---|
| 3,827,288 A | 8/1974 | Fletcher et al. | |
| 3,916,533 A | 11/1975 | Kijesky | |
| 4,025,724 A | 5/1977 | Davidson, Jr. et al. | |
| 6,484,580 B2 * | 11/2002 | Eagen ..................... | G01M 7/00 73/432.1 |
| 6,668,650 B1 * | 12/2003 | Lafleur .................... | G01M 7/00 73/571 |
| 7,319,641 B2 * | 1/2008 | Goudie .................. | H04R 1/403 367/138 |
| 9,109,972 B2 * | 8/2015 | Larkin .................... | G01M 7/00 |

(Continued)

FOREIGN PATENT DOCUMENTS

WO    2013/063491 A1    5/2013

OTHER PUBLICATIONS

Larkin et al., "Recent Developments in Direct Field Acoustic Testing", 26th Space Simulation Conference 2010: Annapolis, MD, Oct. 18-21, 2010, pp. 465-492.

(Continued)

*Primary Examiner* — J M Saint Surin
(74) *Attorney, Agent, or Firm* — Medler Ferro Woodhouse & Mills PLLC (57) ABSTRACT

A direct field acoustic testing system includes at least two acoustical transducer groups and a signal modifier for introducing separately controllable time delays or phase shifts for each acoustical transducer group so as to provide an acoustic field conforming to a pre-determined specification with reduced deviations due to constructive or destructive interference between the acoustical transducer groups.

16 Claims, 10 Drawing Sheets

(56) References Cited

U.S. PATENT DOCUMENTS

| | | | |
|---|---|---|---|
| 9,683,912 B2 * | 6/2017 | Larkin | G01M 7/00 |
| 2003/0108208 A1 | 6/2003 | Thomas et al. | |
| 2012/0300579 A1 * | 11/2012 | Larkin | G01N 29/04 |
| | | | 367/13 |
| 2012/0300580 A1 * | 11/2012 | Underwood | G01M 7/00 |
| | | | 367/13 |

OTHER PUBLICATIONS

Extended European Search Report, EP Application No. 14862322.6, dated May 8, 2017.
International Search Report, Application No. PCT/US2014/065990, dated Feb. 19, 2015.

* cited by examiner

FIG. 1

Improved Assignment of Controller Outputs to Transducer Groups

| Transducer Groups | Mid and HF Transducers | | | | | | | | | LF Transducers | | |
|---|---|---|---|---|---|---|---|---|---|---|---|---|
| Controller Outputs | 1 | 2 | 3 | 4 | 5 | 6 | 7 | 8 | 9 | 10 | 11 | 12 |
| 1 | X | | | X | | | X | | | X | | |
| 2 | | X | | | X | | | X | | | X | |
| 3 | | | X | | | X | | | X | | | X |
| 4 | X | | | X | | | X | | | X | | |
| 5 | | X | | | X | | | X | | | X | |
| 6 | | | X | | | X | | | X | | | X |
| 7 | X | | | X | | | X | | | X | | |
| 8 | | X | | | X | | | X | | | X | |
| 9 | | | X | | | X | | | X | | | X |
| 10 | X | | | X | | | X | | | X | | |
| 11 | | X | | | X | | | X | | | X | |
| 12 | | | X | | | X | | | X | | | X |

STANDING WAVE REDUCTION IN DIRECT FIELD ACOUSTIC TESTING

CROSS-REFERENCE TO RELATED APPLICATION

This application claims the benefit under 35 U.S.C. § 119(e) of U.S. provisional application No. 61/904,931, filed Nov. 15, 2013, the contents of which are incorporated by reference herein in their entirety.

BACKGROUND OF THE INVENTION

Field of the Invention

The present invention relates generally to the field of vibration testing of objects such as satellites, instrumentation or any other object whose reliability in operation may be evaluated using high intensity vibration testing. Specifically, the present invention relates to means and methods for reducing deviations from the specified acoustic field due to constructive or destructive interference between multiple acoustic sources, acoustic standing waves or other modal acoustic behavior encountered in direct field acoustic testing.

Background of the Invention

The specification of co-pending U.S. application Ser. No. 13/117,870, filed May 27, 2011 titled Direct Field Acoustic Testing System and Method (hereinafter "the '870 application") is incorporated by reference herein. As discussed in the '870 application, in the field of Direct Field Acoustic Testing (DFAT) it is generally desirable to obtain an acoustic field having a uniform spectral content and low coherence throughout the space around the Unit Under Test (UUT). As demonstrated in the '870 application, excellent spectral uniformity and low coherence was obtained at the control microphone locations through the use of a Multiple-Input-Multiple-Output (MIMO) arrangement incorporating multiple groups of independently controllable acoustic transducers. As discussed in U.S. Provisional Application No. 61/552,081 and corresponding co-pending International Application No. PCT/US12/62255 claiming priority thereto, both titled Drive Signal Distribution for Direct Field Acoustic Testing (hereinafter referred to collectively as "the Drive Signal Distribution applications"), both of which are incorporated by reference herein in their entirety, improved spectral uniformity at non-control microphone locations was obtained by distribution of combinations of drive signals to the groups of independently controllable acoustic transducers. However, more detailed measurements of the acoustic field around the UUT at non-control microphone locations have demonstrated the presence of significant deviations from uniformity at certain specific frequencies. It is believed that these deviations result either from the constructive or destructive interference of the output of multiple acoustic sources or from acoustic standing waves related to the geometry of the direct field acoustic test setup and the size shape and positioning of the UUT. Such deviations from spectral uniformity may result in over or under excitation of portions of the UUT. Accordingly it is desirable to provide methods for reducing said deviations by suppressing the acoustic mechanisms responsible for causing them.

SUMMARY OF THE INVENTION

Embodiments hereof include a direct field acoustic testing system with at least two groups of acoustical transducers and a signal modifier for introducing separately controllable time delays or phase shifts for each group of acoustical transducers so as to provide an acoustic field conforming to a pre-determined specification with reduced deviations due to constructive or destructive interference between the groups of acoustical transducers.

Embodiments hereof also include a direct field acoustic testing system with at least two microphones to provide at least two acoustical input signals which are used to determine the separately controllable drive signals for the at least two groups of acoustical transducers where said microphones are disposed in an appropriately non-symmetrical arrangement so as to provide an acoustical field conforming to a pre-determined specification with reduced deviations due to acoustical standing waves or other modal acoustic behavior.

Embodiments hereof include a direct field acoustic testing system with at least two groups of acoustical transducers disposed in an appropriate non-symmetrical arrangement with respect to the Unit Under Test (UUT) so as to provide an acoustic field conforming to a pre-determined specification with reduced deviations due to acoustical standing waves or other modal acoustic behavior.

BRIEF DESCRIPTION OF THE DRAWINGS

Embodiments of the invention will now be described, by way of example only, with reference to the accompanying schematic drawings in which corresponding reference symbols indicate corresponding parts.

DETAILED DESCRIPTION OF EMBODIMENTS OF THE INVENTION

Embodiments hereof are now described with reference to the figures where like reference characters/numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the invention.

Figure 1:
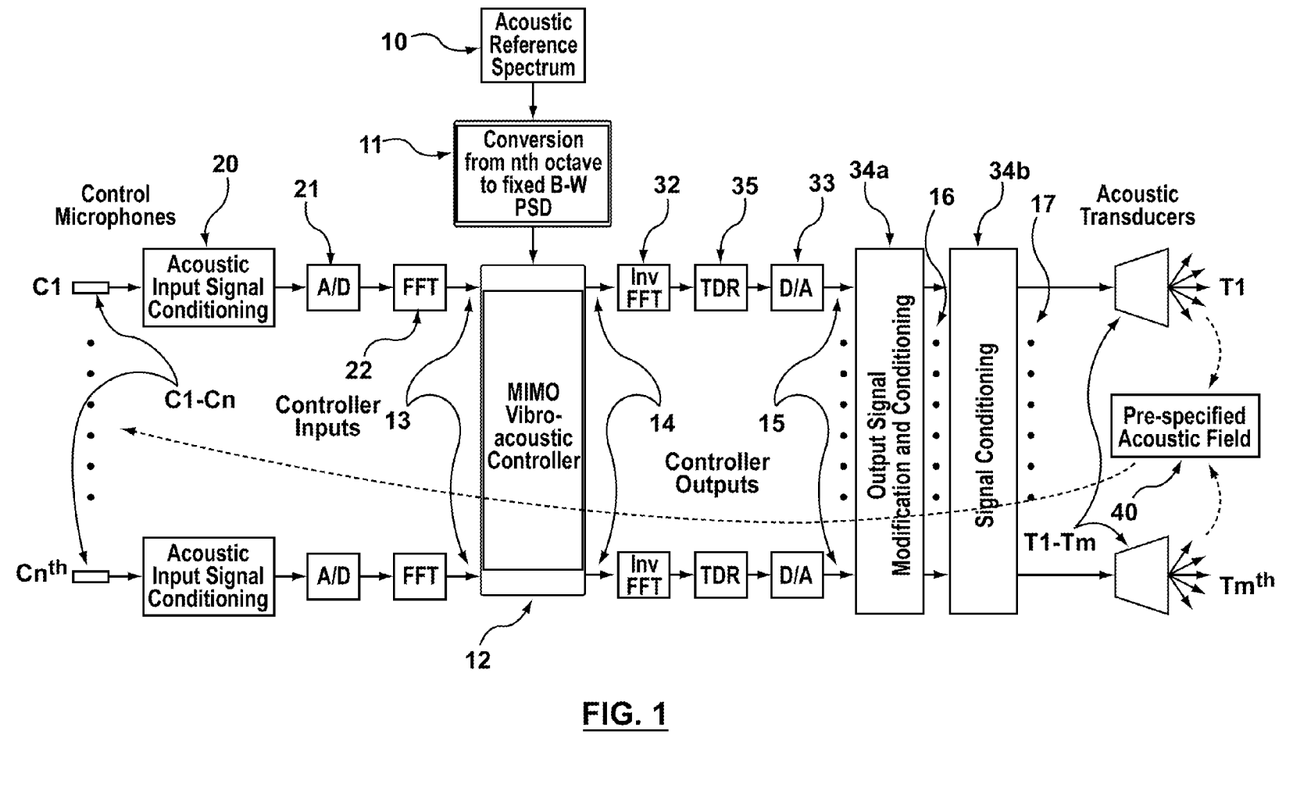
FIG. 1 is a signal diagram in accordance with the Drive Signal Distribution applications.
Figure 2:
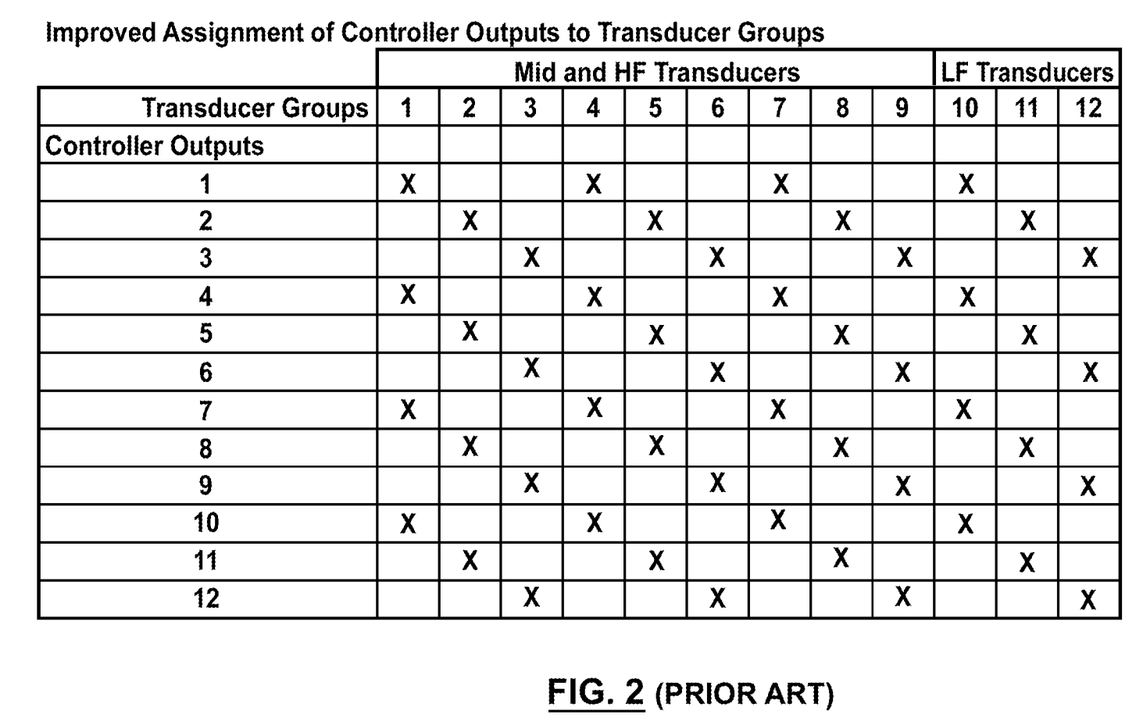
FIG. 2 is a drive signal assignment in accordance with the Drive Signal Distribution applications.
Figure 3:
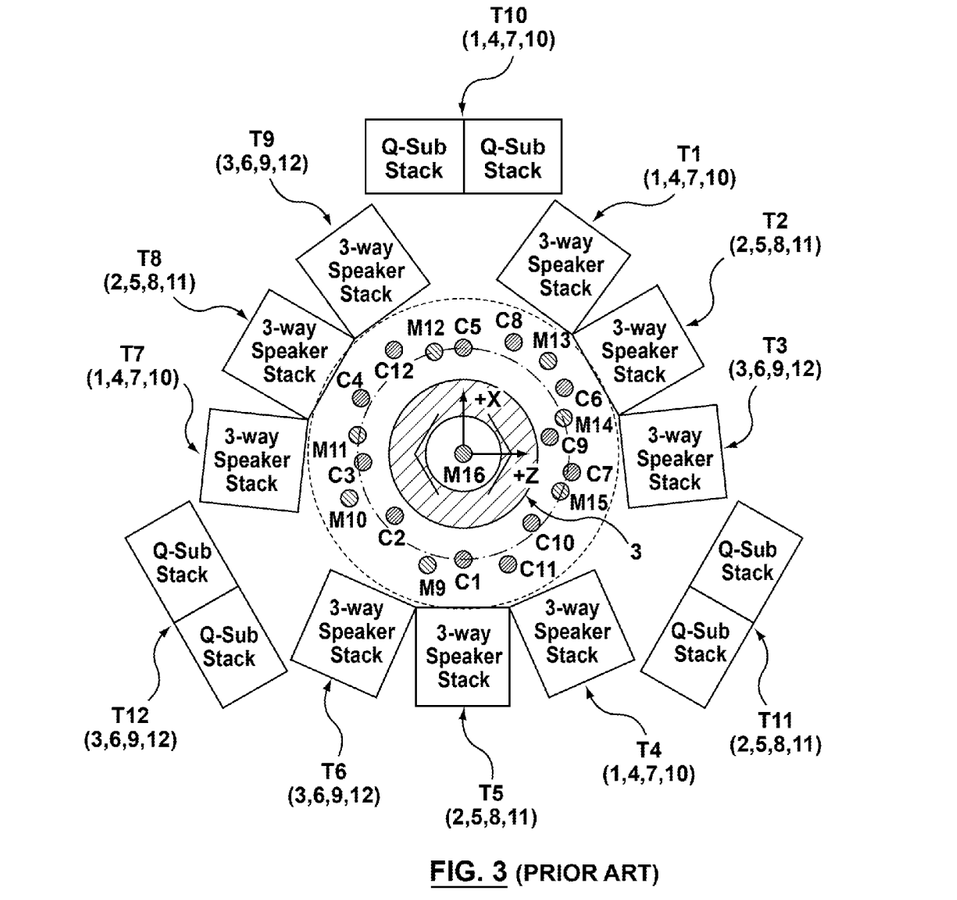
FIG. 3 is a schematic layout and drive assignments in accordance with the Drive Signal Distribution applications.
Figure 4:
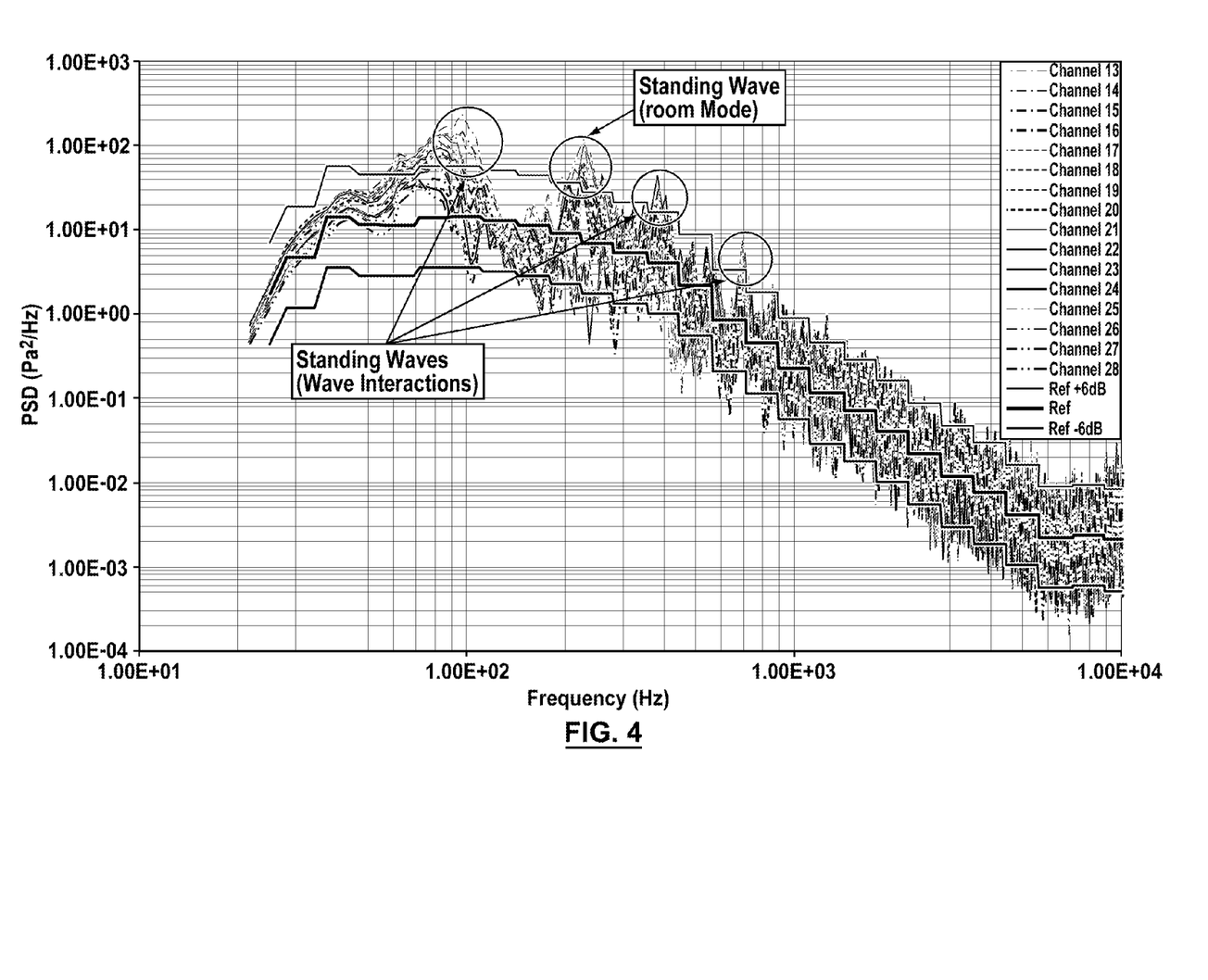
FIG. 4 is a measured acoustic spectrum at control and monitor microphone locations showing spectral anomalies due to acoustic wave interactions, modal and boundary conditions.

Referring to prior art FIG. 1 a diagram is shown corresponding to the Drive Signal Distribution applications. Prior art FIG. 2 shows a chart of drive signal assignments in accordance with the Drive Signal Distribution applications and prior art FIG. 3 shows a schematic arrangement of transducers and drive signals in accordance with the Drive Signal Distribution applications. Referring to FIG. 4, the measured acoustic frequency spectrum is shown for a group of control microphones and monitor microphones for a direct field acoustic test system arranged and operated in accordance with the Drive Signal Distribution applications. Spectral response anomalies labeled "Standing Waves (Wave Interactions)" at approximately 100 Hz, 390 Hz and 700 Hz are believed to be the result of constructive interference between transducers producing the same drive signals according to the drive signal assignment chart of FIG. 2. The anomaly labeled "Standing Wave (Room Modes)" is believed to be related to the boundary conditions created by the physical arrangement of the transducers. All of these anomalies are believed to be in part related to the drive signal assignments of the Drive Signal Distribution applications which cause the same drive signal to be reproduced simultaneously by several transducer groups. Referring to prior art FIG. 1, signal conditioning means 34b includes various electronic means for creating a suitable electronic signal for each group of transducers. By way of example only these electronic means may include; power amplification, gain adjustments, cross-overs, time delay and phase adjustments. A person having ordinary skill in the art will be familiar with the concept of acoustic time-alignment in which time delays are applied to the signals driving different groups of transducers such that their acoustic output signals arrive simultaneously at a pre-determined point in space thereby compensating for differences in external and internal acoustic path lengths or other system related delays such as filters and latency associated with digital signal processing. In Direct Field Acoustic Testing (DFAT) it is standard practice to "time-align" all transducers to the central axis of the test layout. For example, and referring to FIG. 3, it would be standard practice to adjust time delays for transducer groups T1 through T12 such that their acoustic outputs would arrive at the center of the Unit Under Test (UUT), M16, approximately simultaneously. By "approximately simultaneously" it is meant that the acoustic outputs arrive at the center of the UUT within less than 1 millisecond of each other. By way of example, in the prior art layout shown in FIG. 3 "time-alignment" was achieved by applying electronic delays of approximately 18 milliseconds to transducer groups T1 through T9 to compensate for the locations of transducer groups T10 through T12 at a greater distance from M16, the internal acoustic path length of T10 through T12 and delays introduced by low pass filtering applied to signals applied to T10 through T12. It is believed that this so-called "time alignment" is in part responsible for the spectral anomalies shown in FIG. 4 and labeled "Standing Waves (Wave Interactions)".

Figure 5:
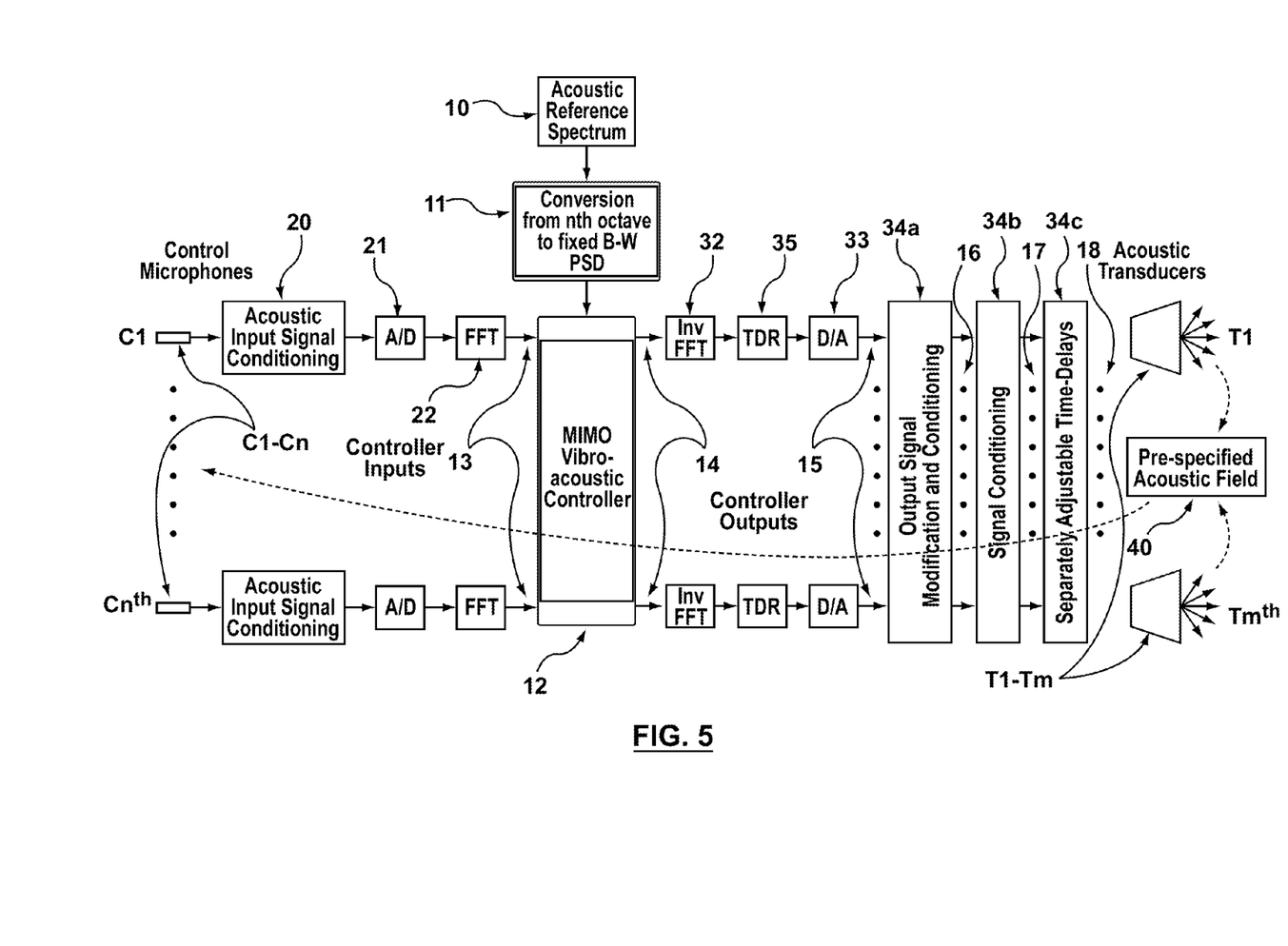
FIG. 5 is a signal diagram in accordance with an embodiment of the present application.
Figure 6:
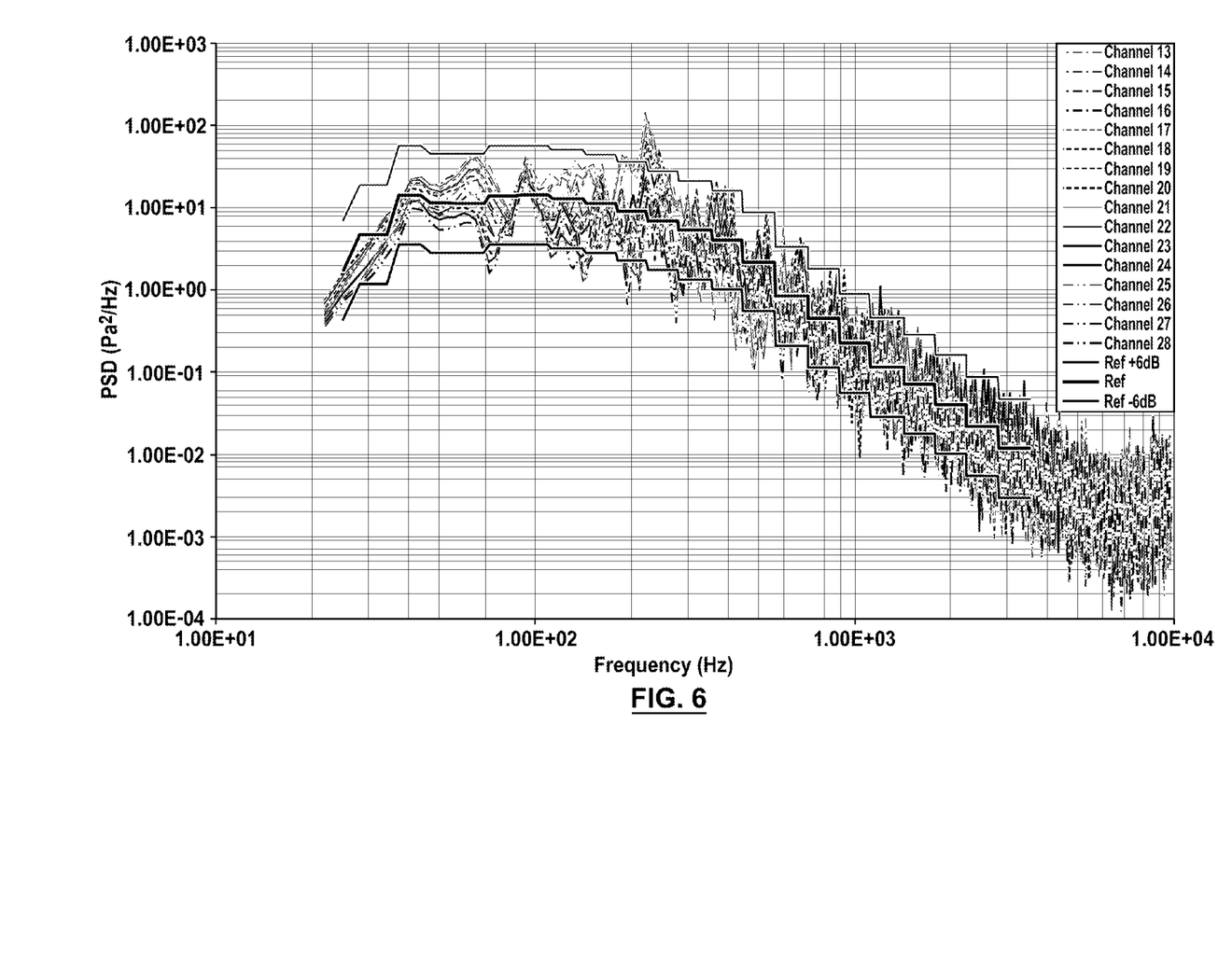
FIG. 6 is a measured acoustic spectrum at control and monitor microphone locations showing reduction of spectral anomalies due to acoustic wave interactions according to an embodiment of the present application.

Accordingly, in an embodiment of the present application and referring to FIG. 5, a signal flow diagram is shown wherein separately adjustable time-delay means 34c have been introduced into the signal path for at least each separately controllable group of transducers. According to this embodiment, the separately adjustable time-delay means 34c are adjusted such that the acoustic output of at least two of the groups of transducers covering the frequency range of the spectral anomalies of FIG. 4 are timed to arrive at the center of the test layout, M16 of FIG. 3, at sufficiently different times so as to reduce said spectral anomalies. By way of example and not of limitation, in a specific implementation of this embodiment the frequency range of transducer groups T1 through T9 of FIG. 3 is configured to overlap the frequency range of transducer groups T10 through T12 from approximately 100 Hz to 200 Hz. Utilizing a combination of electronic time delay means and acoustic path length differences the acoustic output of transducer groups T1 through T9 are timed to arrive at location M16 approximately 10 milliseconds earlier than the acoustic output from transducer groups T10 through T12. Referring to FIG. 6, the measured acoustic frequency spectrum is shown for a group of control microphones and monitor microphones for a direct field acoustic test system arranged and operated in accordance with this embodiment demonstrating a reduction of large spectral anomalies at approximately 100 Hz and 150 Hz. It has been found that differences in acoustic signal arrival times at location M16 of as little as one-fourth the period of the lowest frequency spectral anomaly of interest are effective. For example and referring to the data presented in FIG. 4 and FIG. 6, the lowest frequency spectral anomaly of interest is approximately 100 Hz which would require a minimum arrival time difference of approximately 2.75 milliseconds between transducer groups operating in this frequency range to be effective.

Those skilled in the art will immediately recognize that the time delays required to implement this embodiment of the present invention may be achieved in many different ways. By way of example and not of limitation such time delays may be implemented by commercially available digital electronic means and/or by choosing the physical locations of transducer groups relative to each other and the UUT. By way of example only and in the case of electronic time delays, these delays may be placed anywhere in the signal path so long as they occur after the output signal modification and combination means 34a of FIG. 5. Additionally, the physical placement of the transducers may be manipulated so as to achieve the required relative arrival times of their acoustic outputs or to supplement the use of electronic time delays.

In another embodiment of the present invention the separately adjustable time delays 34c of FIG. 5 are adjusted such that the acoustic outputs from each of transducers groups T1 through T12 will all arrive at location M16 at different times. This method has been shown to provide even greater spectral uniformity but at the cost of greater power consumption. Additionally, the arrival times of acoustic signals from transducer groups reproducing substantially the same frequency range may be individually manipulated by smaller amounts to suppress higher frequency spectral anomalies by using the separately adjustable time delays 34c of FIG. 5. Referring to the data presented in FIG. 4 and FIG. 6, spectral anomalies at 390 Hz and 700 Hz have been reduced by manipulating the arrival of signals from transducer groups T1 through T9 which reproduce substantially the same frequency range to be spread over an approximately 3 millisecond window. This technique is effective for any distribution of arrival times wherein the arrival time of the output of at least one of the transducer groups is different from the others by at least one-fourth the period of the lowest frequency spectral anomaly of interest down to a minimum of 1 millisecond. However, this technique is more effective when the arrival times of acoustic outputs of a larger number of transducer groups all reproducing substantially the same frequency range are spread over a window of arrival times approximately equal to the period of the lowest frequency spectral anomaly of interest down to a minimum of 1 millisecond.

Figure 7:
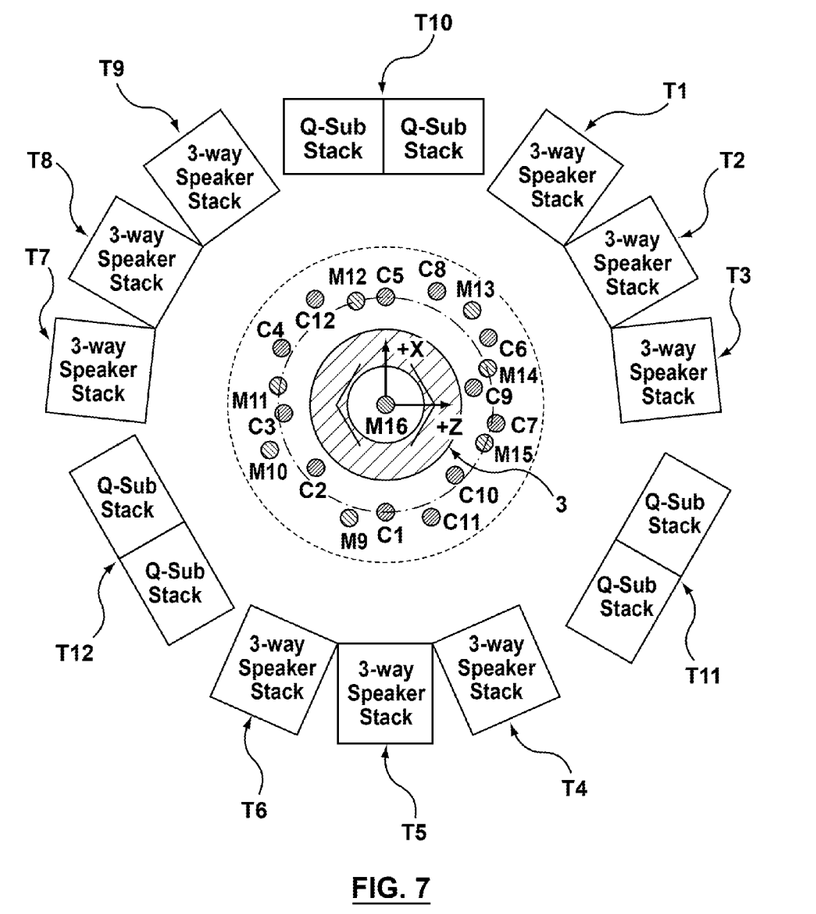
FIG. 7 is a schematic layout of transducers in a DFAT system.

Referring to FIG. 7, a typical DFAT transducer layout is shown which is roughly symmetrical and circular as seen from above. While the use of appropriate time delays has been shown to be generally effective in reducing spectral anomalies certain spectral anomalies, such as the anomaly at approximately 230 Hz shown in FIG. 4 and labeled "Standing Wave (Room Mode)", are related to the symmetrical boundary conditions created by circular or other symmetrical arrangements such as shown in FIG. 7 and are not adequately controlled using the time delay techniques described in the previous embodiments of this application.

Figure 8:
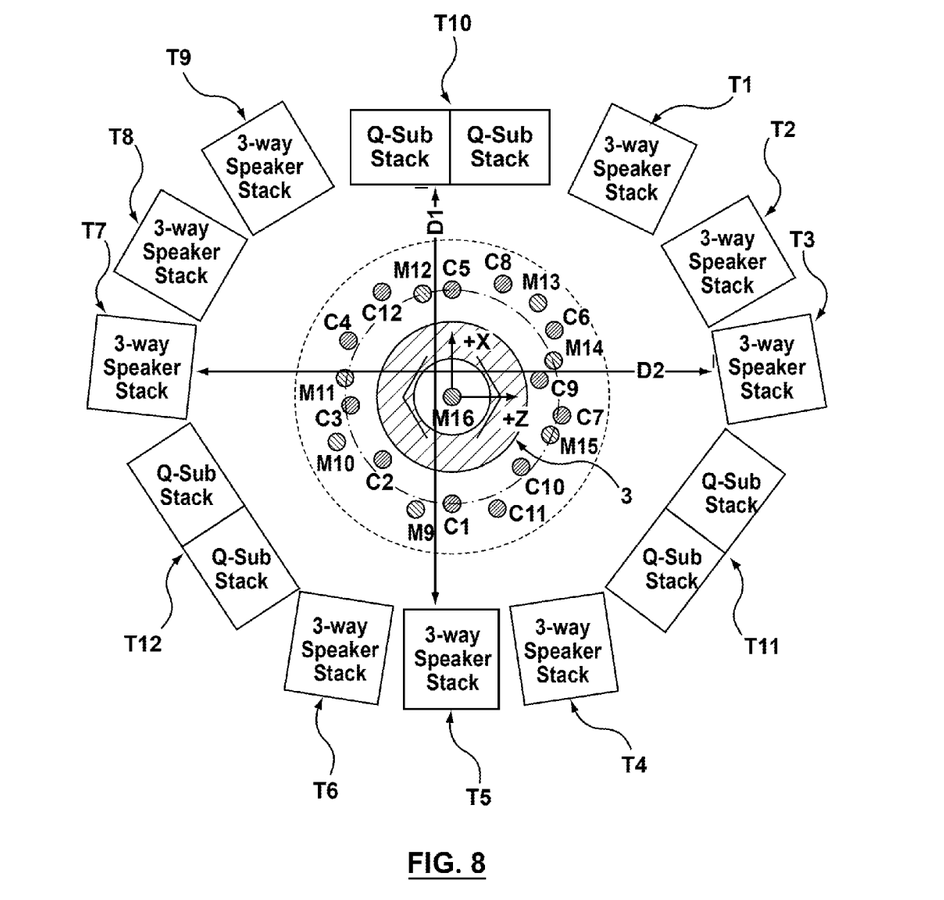
FIG. 8 is a schematic layout of transducers in accordance with an embodiment of the present application.
Figure 9:
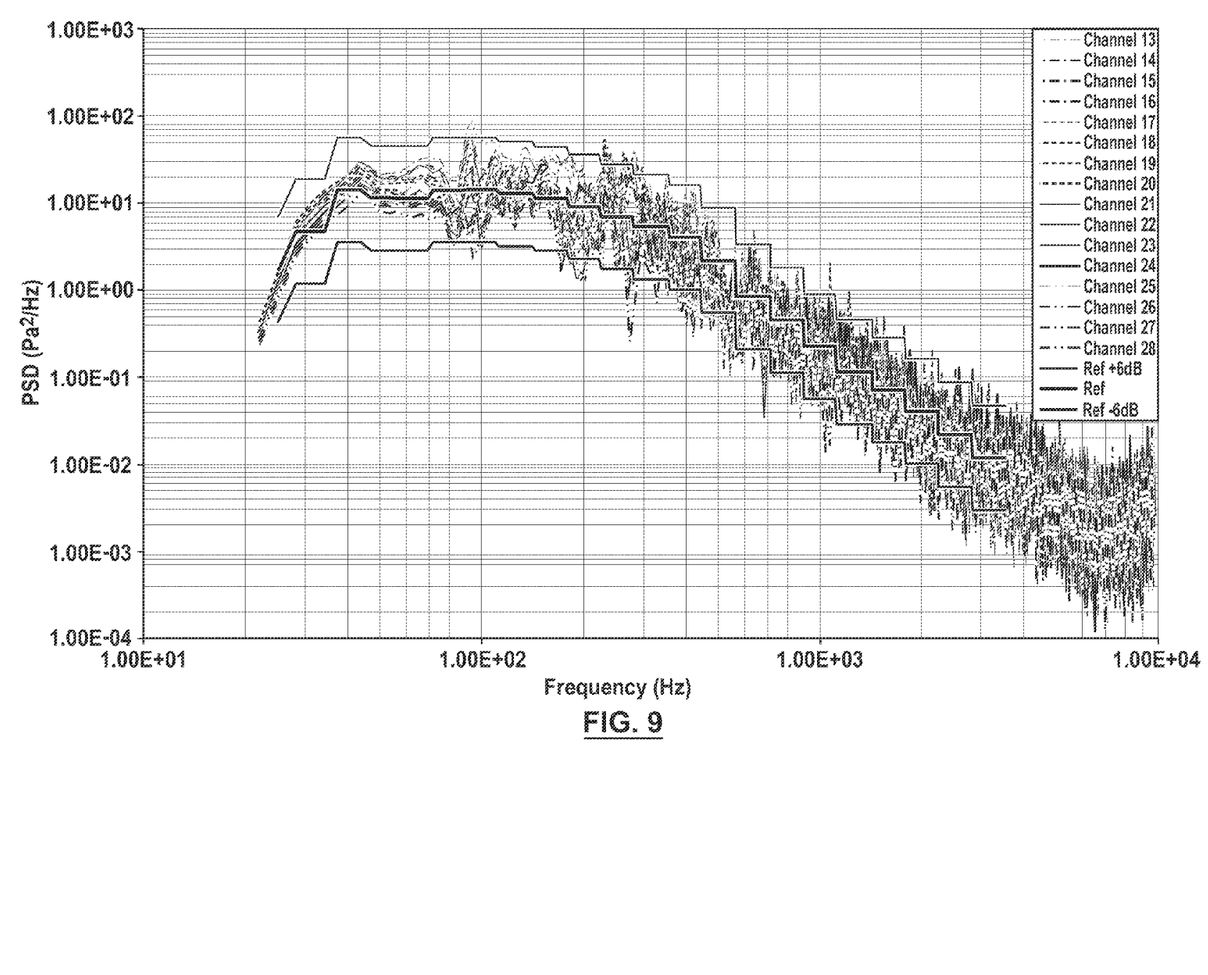
FIG. 9 is a measured acoustic spectrum at control and monitor microphone locations showing reduction of spectral anomalies due to acoustic wave interactions, modal behavior and boundary conditions according to embodiments the present application.

According to another embodiment of the present application, the formation of such standing waves may be inhibited by arranging transducer groups which reproduce substantially the same frequency range around the UUT in an asymmetrical arrangement. For the purposes of this application the "frequency range reproduced by a transducer group" is all frequencies present in the driving signal no more than 6 db below the average level of the driving signal below 1 kHz. Further, transducer groups are considered to be "reproducing substantially the same frequency range" if 80% of the frequency range, as measured in octaves, reproduced by a transducer group below 1 kHz is reproduced by another transducer group or if the frequency ranges reproduced by two transducer groups overlap each other by at least two octaves. For example, transducer groups T1-T9 of FIG. 7 are configured to reproduce substantially the same frequency range. By arranging these transducer groups around the UUT in an asymmetrical arrangement, the boundary conditions created by the physical locations of the transducer groups T1-T9 will not support the formation of standing waves at specific frequencies due to the variation in distance from each respective transducer group to the location M16. In a specific and non-limiting example shown in FIG. 8, an arrangement of transducers is shown which is generally oval and which has been shown to reduce spectral anomalies caused by boundary conditions, specifically, and is also helpful in reducing other types of spectral anomalies. However, other asymmetrical shapes may also be used. For example, and not by way of limitation, elliptical, rectangular, square, or other shapes where the distance from transducer groups reproducing substantially the same frequency range to the location M16 is not uniform may be used. It is believed that by creating acoustic boundaries which are not equidistant from the center of the UUT the formation of strong standing waves is inhibited. While asymmetric placement of transducer groups reproducing substantially the same frequency range has been shown to be effective by itself in inhibiting the formation of standing waves this technique has been shown to be much more effective in reducing all types of spectral anomalies when used in combination with appropriate electronic time delays as described in previous embodiments of this application. Referring to FIG. 9 is shown the measured acoustic frequency spectrum of a group of control and monitor microphones of a DFAT system in accordance with the previous embodiment of the present application and additionally arranged according to FIG. 8 which shows that the spectral anomalies of FIG. 4 and labeled "Standing Wave (Room Modes)" is substantially attenuated. Referring to FIG. 8, in a specific implementation of this embodiment the dimension D1 is approximately 20 feet and the dimension D2 is approximately 24 feet. Experiments have shown that transducer arrangements where the difference between the maximum distance and the minimum distance from a transducer group reproducing substantially the same frequency range to the center of the UUT is at least 1 foot and resulting in an arrival time difference of at least approximately 1 millisecond are effective in reducing the formation of standing waves.

Figure 10:
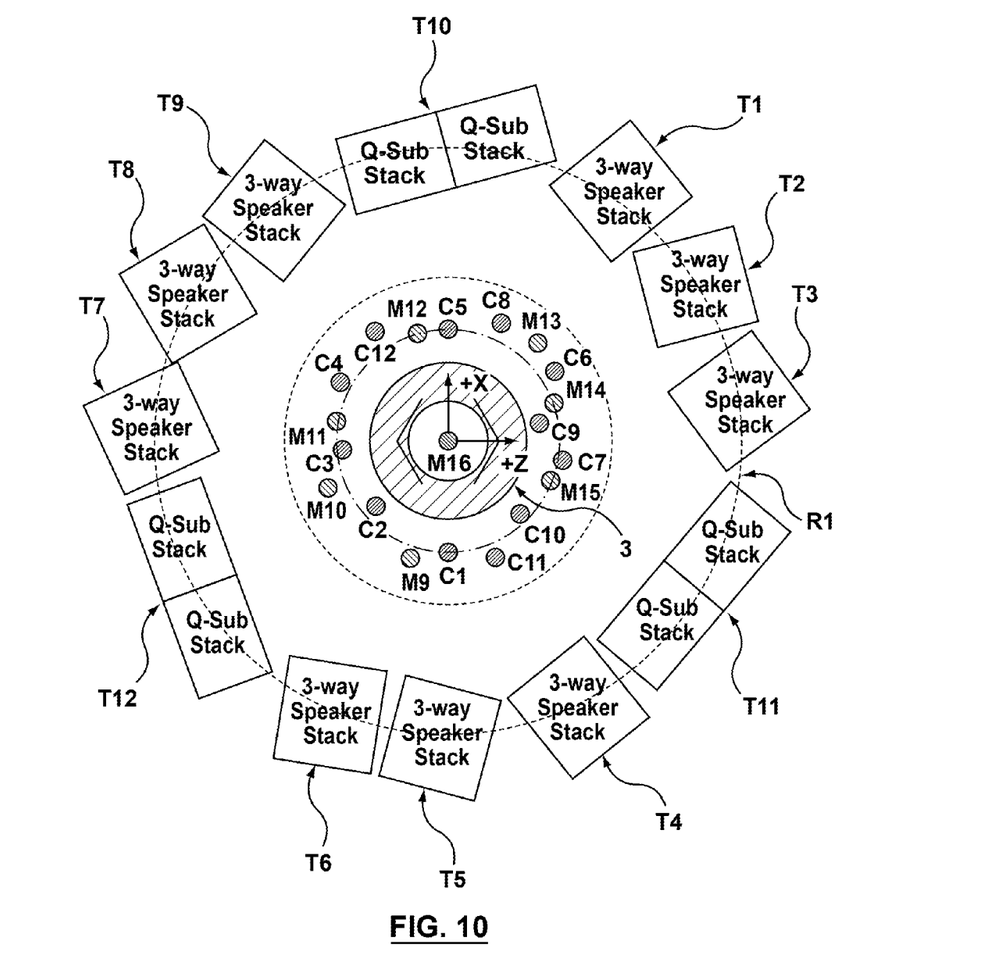
FIG. 10 is a schematic layout of transducers in accordance with another embodiment of the present application.

As will be apparent to those skilled in the art there are many possible ways to arrange the transducers for a DFAT system which reproduce substantially the same frequency range so as to avoid acoustic boundary conditions which will give rise to strong standing waves all of which fall within the scope of the present invention. By way of example and not of limitation and according to another embodiment of the present application, referring to FIG. 10 another arrangement is shown which has been demonstrated to reduce standing wave anomalies. In FIG. 10 the transducers T1 through T9 of FIG. 8 reproduce substantially the same frequency range and have been randomly rotated by between approximately 10 degrees and 30 degrees relative to a line drawn from the center of the respective transducer group to the center of the UUT. The centers of the transducers still lie roughly on a circle, R1 which permits a compact arrangement with a randomized acoustic boundary which has been shown to reduce standing wave behavior.

The invention claimed is:

1. A direct field acoustic testing system comprising:
   a control microphone;
   a controller operatively coupled to the control microphone such that the controller receives at least one input signal from the control microphone;
   at least four acoustic transducer groups, each transducer groups including at least one transducer, wherein the at least four acoustic transducer groups are arranged with the control microphone in a test layout and operatively coupled to the controller such that the output of each transducer is separately controllable by the controller such that a separate output signal is received by each transducer from the controller; and
   a separately adjustable signal modifier disposed in a signal path between the controller and the at least four acoustic transducers, wherein the signal modifier is configured to introduce a time delay configured to be adjusted such that the output of at least two of the at least four acoustic transducers are timed to arrive at a center of the test layout at sufficiently different times so as to reduce spectral anomalies, wherein the time-delay is configured such that a difference between a maximum arrival time of the output of one of the at least four acoustic transducer groups and a minimum arrival time of the output of another one of the at least four acoustic transducer groups is at least 1 millisecond.

2. The direct field acoustic testing system of claim 1, wherein the control microphone and acoustic transducer groups are disposed adjacent a unit to be tested in a simulated reverberant field.

3. The direct field acoustic testing system of claim 1, wherein a plurality of the at least four transducer groups are configured to reproduce substantially the same frequency range, wherein the plurality of transducer groups reproducing substantially the same frequency range are arranged around the center of the test layout in an asymmetrical pattern.

4. The direct field acoustic testing system of claim 3, wherein the asymmetrical pattern is a generally oval pattern.

5. A direct field acoustic testing system comprising:
   a control microphone;

a controller operatively coupled to the control microphone such that the controller receives at least one input signal from the control microphone;

at least four acoustic transducer groups, each transducer groups including at least one transducer, wherein the at least four acoustic transducer groups are arranged with the control microphone in a test layout and operatively coupled to the controller such that the output of each transducer is separately controllable by the controller such that a separate output signal is received by each transducer from the controller; and a separately adjustable signal modifier disposed in a signal path between the controller and the at least four acoustic transducers, wherein the signal modifier is configured to introduce a time delay configured to be adjusted such that the output of at least two of the at least four acoustic transducers are timed to arrive at a center of the test layout at sufficiently different times so as to reduce spectral anomalies, wherein the at least four acoustic transducer groups comprises twelve acoustic transducer groups, and wherein the time delay is configured such that the output of a first group of the twelve transducers is timed to arrive at the center of the test layout a certain time before the output of a second group of the twelve acoustic transducer groups.

6. The direct field acoustic testing system of claim 5, wherein the first group of acoustic transducer groups includes more acoustic transducer groups than the second group of acoustic transducer groups.

7. The direct field acoustic testing system of claim 6, wherein time-delay is configured such that the output of the first group of acoustic transducer groups is timed to arrive at the center of the test layout about 10 msec earlier than the output of the second group of acoustic transducer groups.

8. The direct field acoustic testing system of claim 5, wherein the time-delay is configured such that output of the first group of acoustic transducer groups is timed to arrive at the center of the test layout about 10 milliseconds earlier than the output of the second group of acoustic transducer groups.

9. A direct field acoustic testing system comprising:

a control microphone;

a controller operatively coupled to the control microphone such that the controller receives at least one input signal from the control microphone;

at least four acoustic transducer groups, each transducer groups including at least one transducer, wherein the at least four acoustic transducer groups are arranged with the control microphone in a test layout and operatively coupled to the controller such that the output of each transducer is separately controllable by the controller such that a separate output signal is received by each transducer from the controller; and a separately adjustable signal modifier disposed in a signal path between the controller and the at least four acoustic transducers, wherein the signal modifier is configured to introduce a time delay configured to be adjusted such that the output of at least two of the at least four acoustic transducers are timed to arrive at a center of the test layout at sufficiently different times so as to reduce spectral anomalies, wherein the time-delay is configured such that the output of each of the at least four acoustic transducer groups is timed to arrive at the center of the test layout at a different time such that a difference between a maximum time arrival of the output of one of the at least four acoustic transducer groups and a minimum arrival time of the output of another one of the at least four acoustic transducer groups is at least 1 millisecond.

10. A direct field acoustic testing system comprising:

a control microphone;

a controller operatively coupled to the control microphone such that the controller receives at least one input signal from the control microphone;

at least four acoustic transducer groups, each transducer groups including at least one transducer, wherein the at least four acoustic transducer groups are arranged with the control microphone in a test layout and operatively coupled to the controller such that the output of each transducer is separately controllable by the controller such that a separate output signal is received by each transducer from the controller; and a separately adjustable signal modifier disposed in a signal path between the controller and the at least four acoustic transducers, wherein the signal modifier is configured to introduce a time delay configured to be adjusted such that the output of at least two of the at least four acoustic transducers are timed to arrive at a center of the test layout at sufficiently different times so as to reduce spectral anomalies, wherein the at least four acoustic transducer groups comprises twelve acoustic transducer groups, and wherein the time-delay is configured such that the output of each of the twelve acoustic transducer groups is timed to arrive at the center of the test layout at a different time such that a difference between a maximum time arrival of the output of one of the twelve acoustic transducer groups and a minimum arrival time of the output of another one of the twelve transducer groups is at least 1 millisecond.

11. A direct field acoustic testing system comprising:

at least one control microphone;

a controller operatively coupled to the control microphone such that the controller receives at least one input signal from the control microphone; and at least four acoustic transducer groups configured to reproduce substantially the same frequency range, wherein the at least four transducer groups are arranged with the control microphone in a test layout around a unit under test, wherein the at least four acoustic transducer groups are operatively coupled to the controller such that the output of each acoustic transducer group is separately controllable by the controller such that a separate output signal is received by each acoustic transducer group from the controller; wherein the at least four acoustic transducer groups are arranged around the unit under test in an asymmetrical pattern to inhibit the formation of standing waves.

12. The direct field acoustic testing system of claim 11, wherein the asymmetrical pattern is a generally oval pattern.

13. The direct field acoustic testing system of claim 12, wherein the generally oval pattern includes two diameters, with a first diameter being smaller than a second diameter.

14. The direct field acoustic testing system of claim 13 wherein the first diameter is at least two feet less than the second diameter.

15. A direct field acoustic testing system comprising:

at least one control microphone;

a controller operatively coupled to the control microphone such that the controller receives at least one input signal from the control microphone; and at least four acoustic transducer groups configured to reproduce substantially the same frequency range, wherein the at least four transducer groups arranged with the control microphone in a test layout around a unit under test, wherein the at least four acoustic transducer groups are operatively coupled to the controller such that the output of each acoustic transducer group is separately controllable by the controller such that a separate output signal is received by each acoustic transducer group from the controller;

wherein the at least four acoustic transducer groups are arranged around the unit under test such that each of the at least four acoustic transducer groups is disposed at an angle between 10 and 30 degrees relative to an imaginary line drawn from a center of the respective transducer group to a center of the unit under test.

16. The direct field acoustic testing system of claim 15, wherein the at least four acoustic transducer groups comprises nine acoustic transducer groups.

* * * * *